United States Patent
Cheng (10) Patent No.: US 11,215,317 B2
(45) Date of Patent: Jan. 4, 2022

(54) ELASTIC TELESCOPIC MODULE AND AN ELEVATING DEVICE USING THE SAME

(71) Applicant: Jarllytec Co., Ltd., New Taipei (TW)

(72) Inventor: Chien-Wei Cheng, New Taipei (TW)

(73) Assignee: JARLLYTEC CO., LTD., New Taipei (TW)

( * ) Notice: Subject to any disclaimer, the term of this patent is extended or adjusted under 35 U.S.C. 154(b) by 0 days.

(21) Appl. No.: 16/913,772

(22) Filed: Jun. 26, 2020

(65) Prior Publication Data
US 2021/0164606 A1    Jun. 3, 2021

(30) Foreign Application Priority Data
Nov. 28, 2019 (TW) ................................ 108143510

(51) Int. Cl.
*F16M 11/28* (2006.01)
(52) U.S. Cl.
CPC .................................. *F16M 11/28* (2013.01)
(58) Field of Classification Search
CPC ...... F16M 11/28; F16M 11/24; F16M 11/046; F16F 1/10; F16F 1/123; F16F 1/12; Y10S 248/917; Y10S 248/919; Y10S 248/92; A47B 9/12; A47B 9/20
USPC ............. 248/333, 404, 406.2; 267/166–180, 267/69–74; 108/147
See application file for complete search history.

(56) References Cited

U.S. PATENT DOCUMENTS

| | | | | |
|---|---|---|---|---|
| 5,556,428 A | * | 9/1996 | Shah .................. | A61B 17/1146 606/151 |
| 5,769,893 A | * | 6/1998 | Shah .................. | A61B 17/1146 424/423 |
| 7,412,931 B2 | * | 8/2008 | Seidl ....................... | A47B 9/02 108/147 |
| 9,976,691 B2 | * | 5/2018 | Chin .................... | F16M 11/046 |
| 2006/0075941 A1 | * | 4/2006 | Seidl ....................... | A47B 9/10 108/102 |
| 2007/0102600 A1 | * | 5/2007 | Ishizaki ............... | F16M 11/105 248/176.3 |
| 2011/0024596 A1 | * | 2/2011 | Kephart ............... | F16M 11/045 248/440.1 |

(Continued)

FOREIGN PATENT DOCUMENTS

CN          208703490 U      4/2019

*Primary Examiner* — Christopher Garft
(74) *Attorney, Agent, or Firm* — Muncy, Geissler, Olds and Lowe, P.C.

(57) ABSTRACT

An elevating device comprises a base, a support on the base, an elastic telescopic module on the support, and an adapter connected with the elastic telescopic module. The elastic telescopic module comprises a first frame body with a first accommodating space therein for positioning a first constant-force spring, and a second frame body with a second accommodating space therein for positioning a second constant-force spring. The second frame body has an top end located beneath the first frame body's bottom end, the first constant-force spring has one end passing out of the first accommodating space and fixed onto the bottom end of the second frame body, while the second constant-force spring has one end passing out of the second accommodating space and fixed onto the top end of the first frame body, so that the first and second frame body are moved in a reverse direction.

18 Claims, 10 Drawing Sheets

(56) References Cited

U.S. PATENT DOCUMENTS

2017/0219158 A1\* 8/2017 Chin ................... F16M 11/22
2017/0261150 A1\* 9/2017 Lee ..................... F16M 11/046

\* cited by examiner

ELASTIC TELESCOPIC MODULE AND AN ELEVATING DEVICE USING THE SAME

BACKGROUND OF THE INVENTION

Field of Invention

The present invention is related to an elastic telescopic module and an elevating device using the same, and more particularly, to an elastic telescopic module and an elevating device using the same, mounted on the rear side of a display and capable of making the overall structure thinner, prolonging the service time of the display, and increasing the range of upward and downward movement of the display.

Prior Art

For conventional displays, it is only able to adjust their elevation angles. Moreover, some conventional displays may be provided with an elevating device to adjust its heights, so as to meet the needs from users with different statures. In general, an elevating device works by means of the relative movement of a fixed sliding track and a movable sliding tract both of which are of constant specifications, so as to move a display up or down, and its resilient force is generated by at least one constant-force spring. When being actually used, it often is stretched out and positioned by one single constant-force spring. Since all the support force is provided by the constant-force spring, the constant-force spring would be bulky in size. Consequently, it would be difficult to meet the request of being thinner.

Referring to China Patent (CN208703490U) with the title of "An elevation-adjusting structure for a vertical supporting device", it comprises a support, a plate-shaped sliding element, an elastic module, and an auxiliary elastic module. The plate-shaped sliding element has a plate-shaped sliding part sliding in the elongate position-limiting slot of the support. The elastic module and the auxiliary elastic module are both received in the guiding slot of the support and connected onto the internal surface of the narrow side of the support. The elastic module is connected with and moved up and down with the plate-shaped sliding element. The sliding part of the plate-shaped sliding element is provided with an auxiliary adjusting unit and an auxiliary friction unit. Via the auxiliary adjusting unit, it is optional to be connected or not with the auxiliary elastic module, so as to increase or maintain the constant elastic force of the plate-shaped sliding element against the loading, and thus it is able to provide supporting function in corporation with or not with the auxiliary friction unit.

SUMMARY OF THE INVENTION

However, according to the structure disclosed in above China Patent with the title of "An elevation-adjusting structure for a vertical supporting device", the constant-force spring of each elastic module has a free end screwed onto one lateral surface of the support via a screw without being bent. During the stretching out of the constant-force spring, each constant-force spring is bent into a curved shape and is pressed against the lateral plate surface of the support and exerts friction on the support. If the constant-force spring is over-pressed by the lateral plate surface, it would increase the risk that the constant-force spring is broken or dislocated and deformed. Moreover, several sets of constant-force springs are required to provide sufficient stretching force. However, conventionally, for the fixing of a constant-force spring, a spring leaf is required to be stretched out in advance. Consequently, larger space is required for the assembly, which further limits the range of the up and down movement of the display. In view of this, the present invention is aimed at providing a novel structure distinguished from the conventional one and at overcoming these drawbacks.

An object of the present invention is to provide an elastic telescopic module and an elevating device using the same in order to overcome the drawbacks, such as the drawback of the bulky size of the conventional elevating device as a result of the large size of the conventional constant-force spring since the conventional elevating device is stretched out and positioned by one single constant-force spring, and thus unable to meet the request of being thinner, and the drawback of the short service life caused by the fact that all the support force for the up and down movement is provided by the constant-force spring. Moreover, the present invention is able to modulize the structure and to make it thinner, so that it is able to meet the requirements for the use and assembly using a constant-force spring with smaller size, to be convenient in manufacturing and assembling, to meet the demand on the outward appearance of the thinner design, and to reduce the required space.

An object of the present invention is to provide an elastic telescopic module and an elevating device using the same in order to solve the problem concerning the deformation of the stretched constant-force spring, and the problem that the elevation range is restricted when several sets of constant-force springs are used. It is able to provide sufficient support force for the up and down movement by having the constant-force springs assembled in a mutually covering way, is able to prolong the service time by changing the location where a screw is screwed to prevent the constant-force spring from being arched during the stretching process, and is able to increase the range of movement and flexibility of use by reducing the space required for the assembly of each constant-force spring.

In order to achieve the above-mentioned object, the present invention provides an elastic telescopic module comprising a first frame body, a second frame body, a first constant-force spring, and a second constant-force spring. The first frame body is provided with a first accommodating space therein. The second frame body has a top end located beneath the bottom end of the first frame body, and the second frame body is provided with a second accommodating space therein. The first constant-force spring is located within the first accommodating space of the first frame body, where the first constant-force spring has one end passing out of the first accommodating space and fixed onto the bottom end of the second frame body. The second constant-force spring is located within the second accommodating space of the second frame body, where the second constant-force spring has one end passing out of the second accommodating space and fixed onto the top end of the first frame body In implementation, the top end of the first frame body is provided with an upper convex surface, the second constant-force spring has one end provided with a curved section with preset deformation, and the curved section is used to be connected with and fastened onto the upper convex surface.

In implementation, the curved section of the second constant-force spring is further locked onto the upper convex surface of the first frame body by a first press-fit piece.

In implementation, the top end of the first frame body is provided with an upper positioning part for positioning one connection section of one end of the second constant-force spring.

In implementation, the upper positioning part is a protruding block, the connection section has a second hole into which the upper positioning part is fitted, and the upper positioning part has a top end provided with a hook structure for preventing one end of the second constant-force spring from being loosened.

In implementation, the first frame body includes a top plate, two first lateral plates, and a first stop plate; the top plate and the two first lateral plates are arranged to form the first accommodating space; the first stop plate has two ends respectively connected with the two first lateral plates; the first stop plate is provided with a protruding top edge and a first concave surface; the first concave surface is used for correspondingly receiving the first constant-force spring; and the top edge of the first stop plate, the top plate, and the two first lateral plates are arranged to form a first window from which one end of the first constant-force spring passes out.

In implementation, the top end of the first frame body has two lateral sides respectively formed with a step portion having an opening; two parallel first channels are provided between the two first lateral plates; one first channel is located adjacent to the first accommodating space to communicate the first accommodating space with the opening of the step portion provided on one lateral side of the top end of the first frame body for the second constant-force spring's spring leaf to pass through; the other first channel is located adjacent to the first window to communicate the first window with the opening of the step portion provided on the other lateral side of the top end of the first frame body for the first constant-force spring's spring leaf to pass through.

In implementation, the bottom end of the second frame body is provided with a lower convex surface; and the first constant-force spring has one end provided with a curved section with preset deformation, and the curved section is used to be connected with and fastened onto the lower convex surface.

In implementation, the curved section of the first constant-force spring is further locked onto the lower convex surface of the second frame body by a second press-fit piece.

In implementation, the bottom end of the second frame body is provided with a lower positioning part for positioning one connection section of one end of the first constant-force spring.

In implementation. the lower positioning part is a protruding block, the connection section has a first hole into which the lower positioning part is fitted, and the lower positioning part has a bottom end provided with a hook structure for preventing one end of the first constant-force spring from being loosened.

In implementation, the second frame body includes a bottom plate, two second lateral plates, and a second stop plate; the bottom plate and the two second lateral plates are arranged to form the second accommodating space; the second stop plate has two ends respectively connected with the two second lateral plates; the second stop plate is provided with a protruding bottom edge and a second concave surface; the second concave surface is used for correspondingly receiving the second constant-force spring; and the bottom edge of the second stop plate, the bottom plate, and the two second lateral plates are arranged to form a second window from which one end of the second constant-force spring passes out.

In implementation, the bottom end of the second frame body has two lateral sides respectively formed with a step portion having an opening; two parallel second channels are provided between the two second lateral plates; one second channel is located adjacent to the second accommodating space to communicate the second accommodating space with the opening of the step portion provided on one lateral side of the bottom end of the second frame body for the first constant-force spring's spring leaf to pass through; the other second channel is located adjacent to the second window to communicate the second window with the opening of the step portion provided on the other lateral side of the bottom end of the second frame body for the second constant-force spring's spring leaf to pass through.

The present invention also provides an elevating device comprising the elastic telescopic module, and further comprising a base, a support, and an adapter. The support stands on and connected to a top surface of the base, where the support has one lateral surface recessed with an elongate position-limiting slot; the first frame body of the elastic telescopic module is positioned in the elongate position-limiting slot, and a pair of guide tracks is provided at a left side and a right side of the elongate position-limiting slot, so as to limit the longitudinal elevation of the second frame body of elastic telescopic module within the elongate position-limiting slot. The adapter has a right side and a left side connected with the pair of guide tracks, where the adapter has one end connected with the second frame body of the elastic telescopic module for moving the second frame body up and down relative to the support and the first frame body.

In implementation, the end of the adapter is further provided with a protruding plate; the top end of the second frame body is provided with a second position-limiting slot for inserting horizontally and positioning the protruding plate therein; the elongate position-limiting slot of the support is provided with another protruding plate; the bottom end of the first frame body is recessed with a first position-limiting slot for inserting horizontally and positioning the other protruding plate therein; thereby, during the process of the protruding plate of the adapter being pressed downward to be against the second frame body, the other protruding plate of the support supports the first frame body to move the second frame body away from the first frame body; during the process of the second frame body being moved upward by the adapter, the second frame body is gradually restored toward and jointed with the first frame body.

Implementation, the first position-limiting slot has two lateral sides respectively provided with at least one first tenon and at least one first hole, the second position-limiting slot has two lateral sides respectively provided with at least one second tenon and at least one second hole; the at least one second tenon is correspondingly connected into the at least one first hole, and the at least one first tenon is correspondingly connected into the at least one second hole, so as to have the first position-limiting slot and the second position-limiting slot jointed with each other to form an inserting slot.

In implementation, one protruding plate of the adapter has a bevel surface; the second position-limiting slot is provided with two second in-slot bevel surfaces therein; and the bevel surface of the protruding plate is jointed with one second in-slot bevel surface.

In implementation, the other protruding plate of the support has a bevel surface; the first position-limiting slot is provided with two first in-slot bevel surfaces therein, for the bevel surface of the protruding plate to be jointed with one first in-slot bevel surface.

In implementation, the first frame body has one lateral surface provided with a first longitudinal groove; the elongate position-limiting slot has an internal wall surface provided with a longitudinal track; and the longitudinal track is jointed with the first longitudinal groove.

In implementation, the second frame body has one lateral surface provided with a second longitudinal groove; the elongate position-limiting slot has an internal wall surface provided with a longitudinal track; and the longitudinal track is jointed with the second longitudinal groove.

The present invention will become more fully understood by reference to the following detailed description thereof when read in conjunction with the attached drawings.

DETAILED DESCRIPTION OF THE INVENTION

Figure 1:
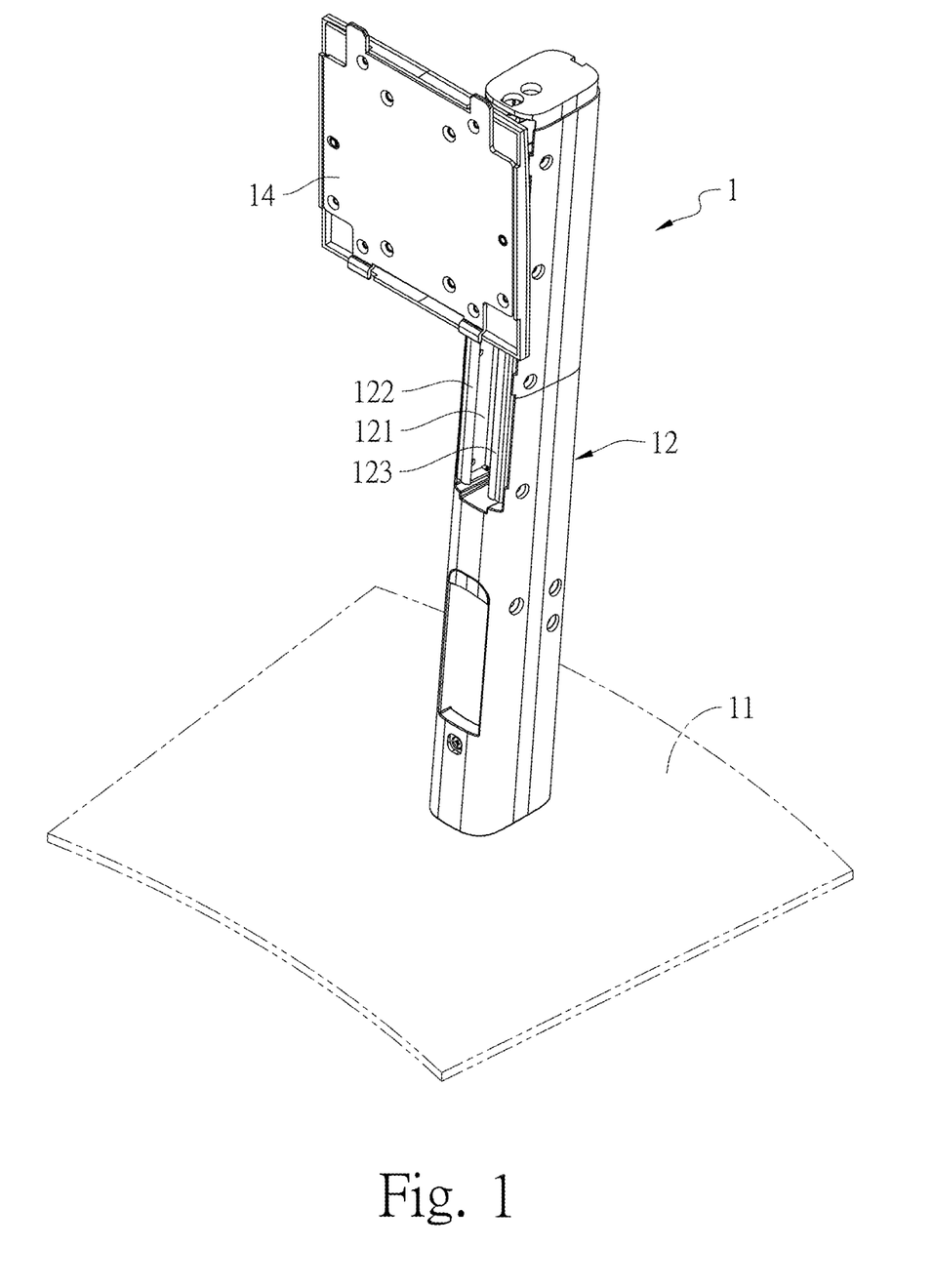
FIG. 1 is a perspective view showing a preferred embodiment of an elevating structure according to the present invention.
Figure 2:
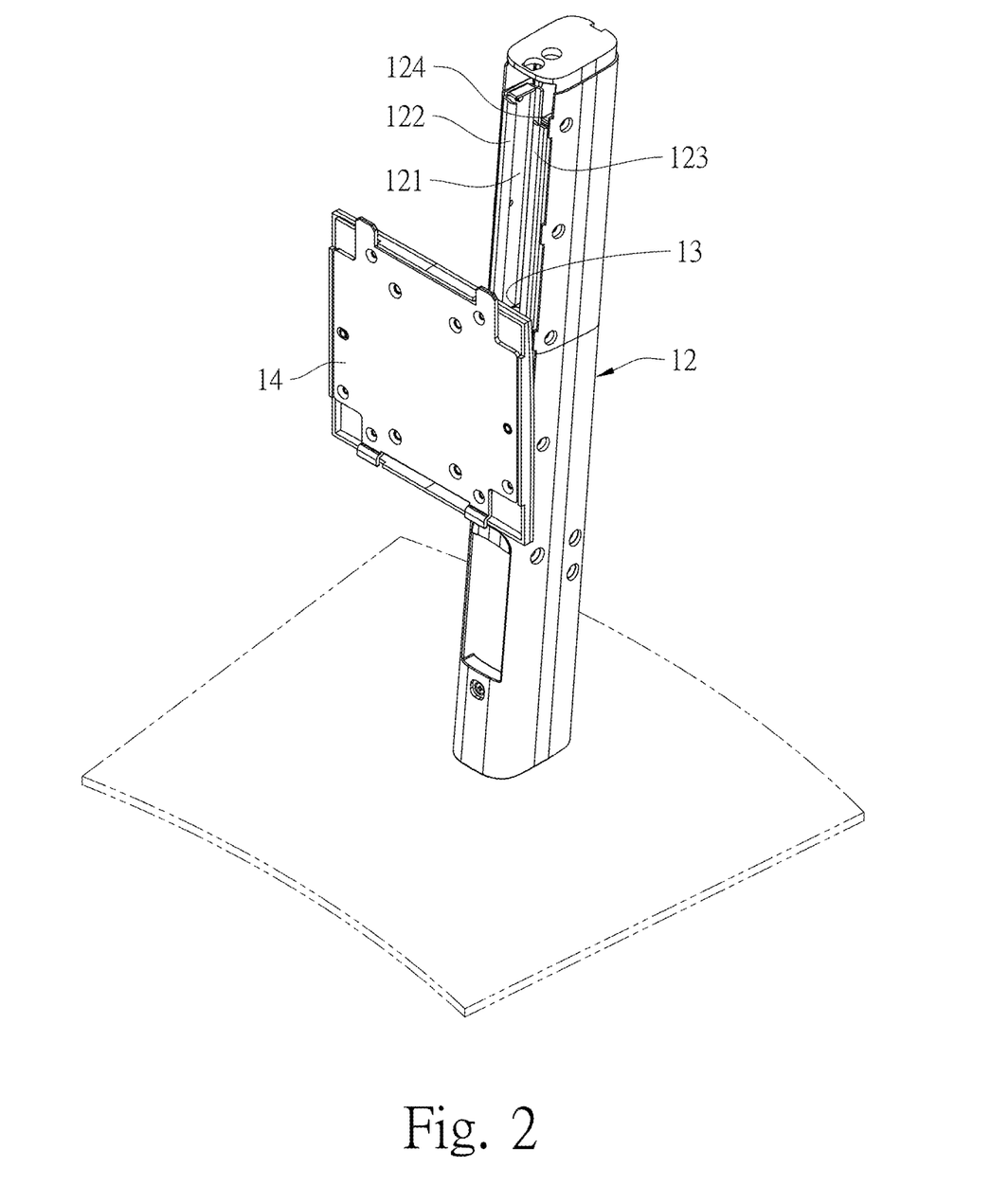
FIG. 2 is a perspective view showing the downward movement and the positioning of the elevating structure according to the present invention.
Figure 3:
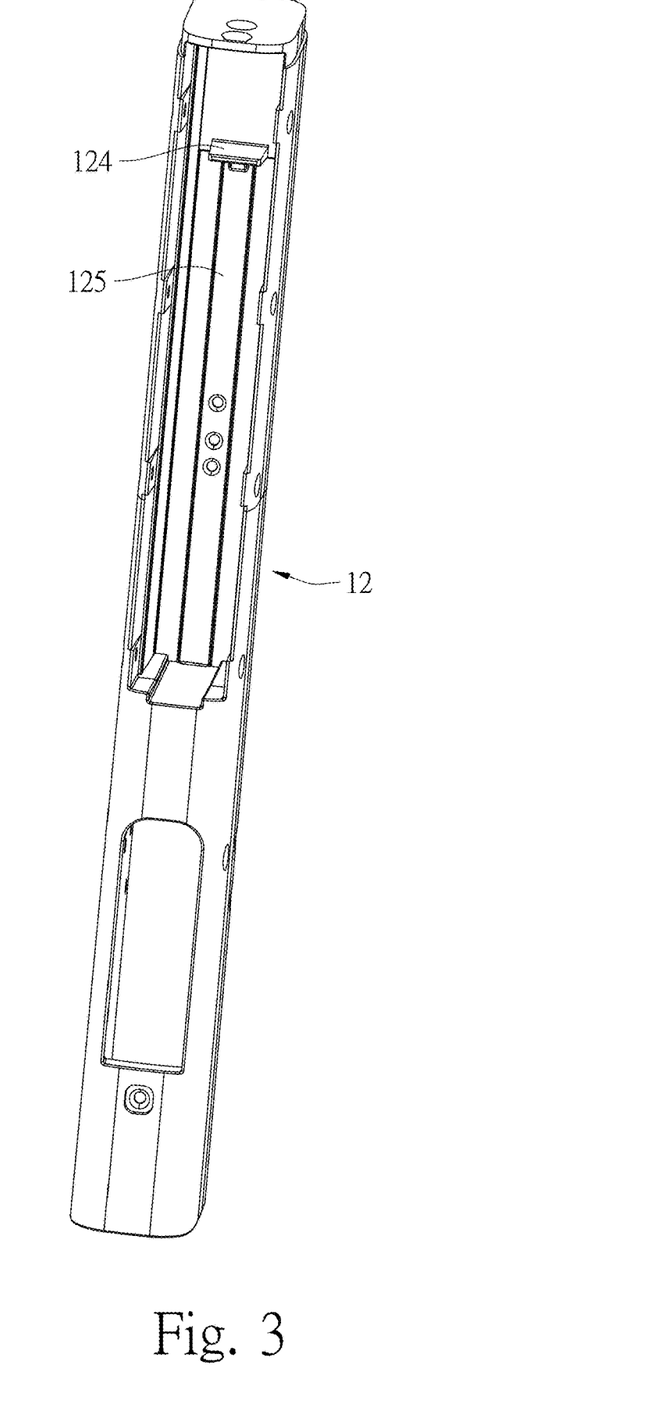
FIG. 3 is a perspective view showing a support according to the present invention.
Figure 4:
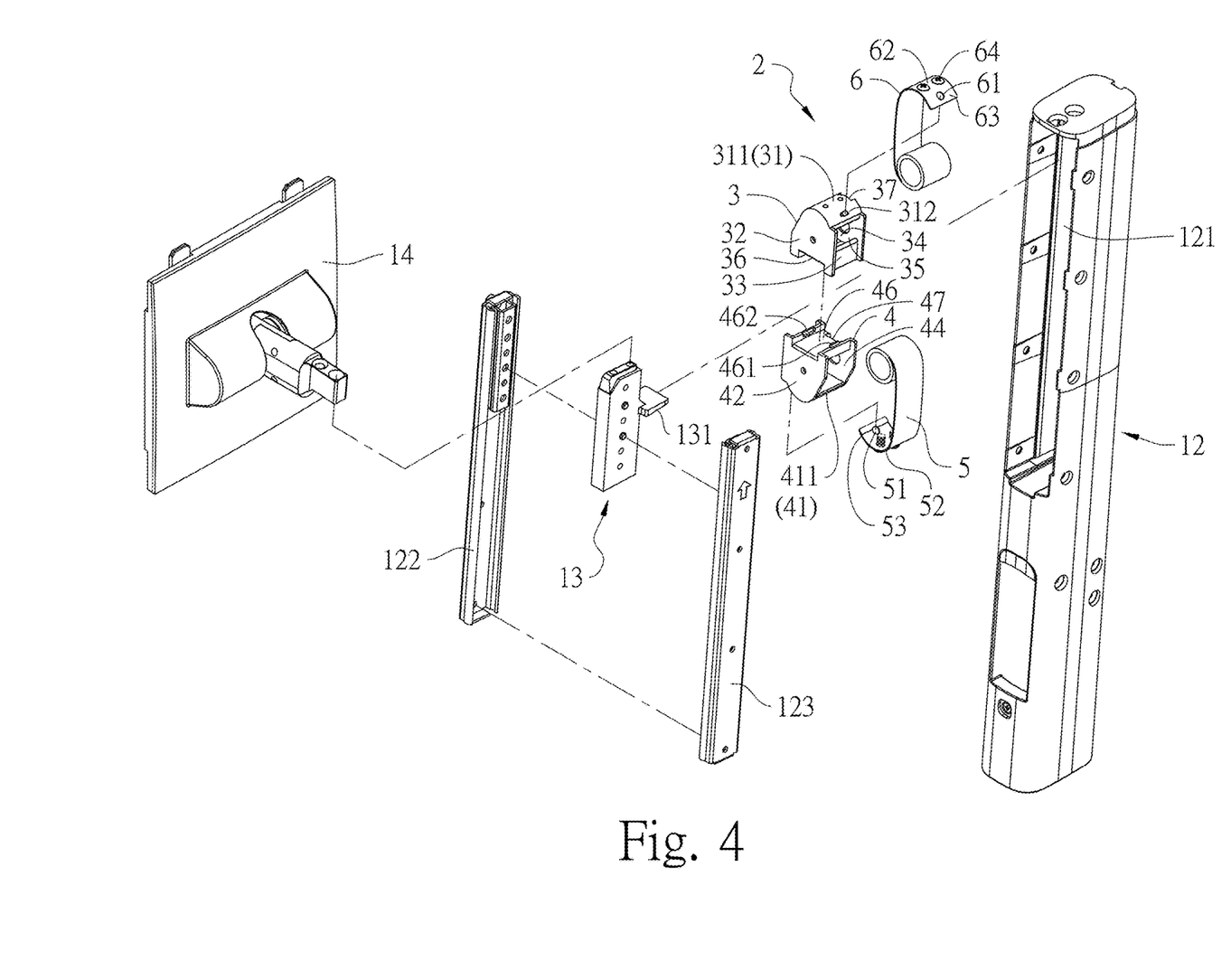
FIG. 4 is an exploded view showing some components of the elevating structure according to the preferred embodiment of the present invention.
Figure 5:
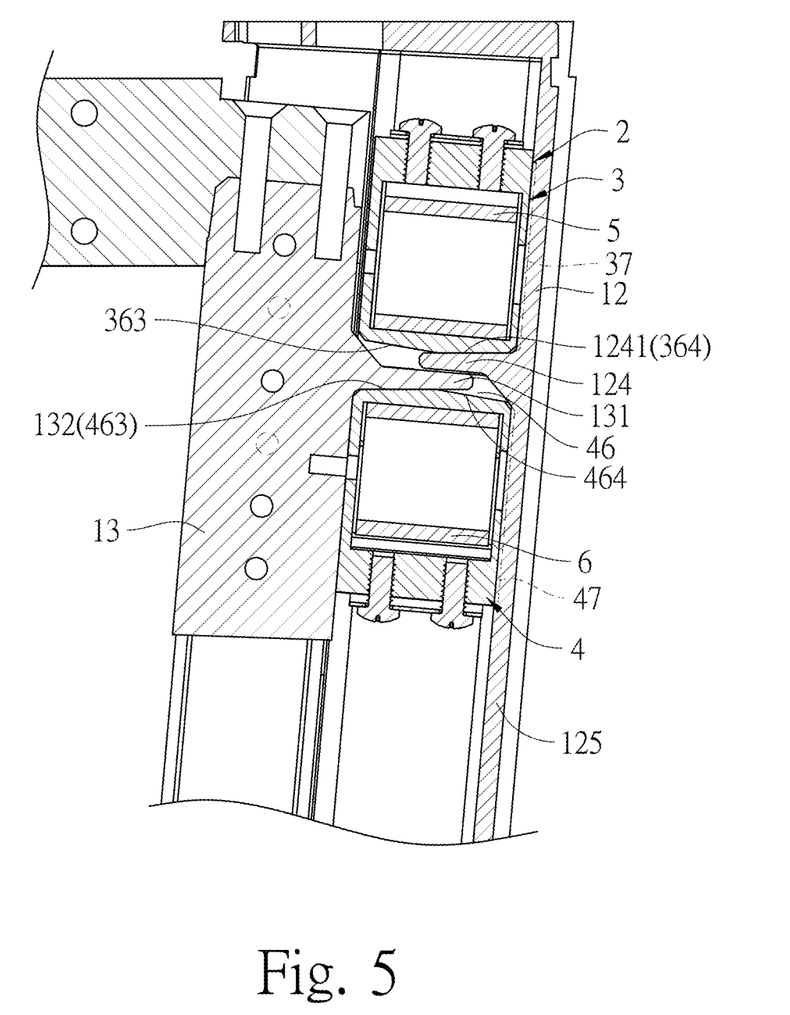
FIG. 5 is a cross-section view showing the connection of the elastic telescopic module and the adapter according to the present invention.
Figure 6:
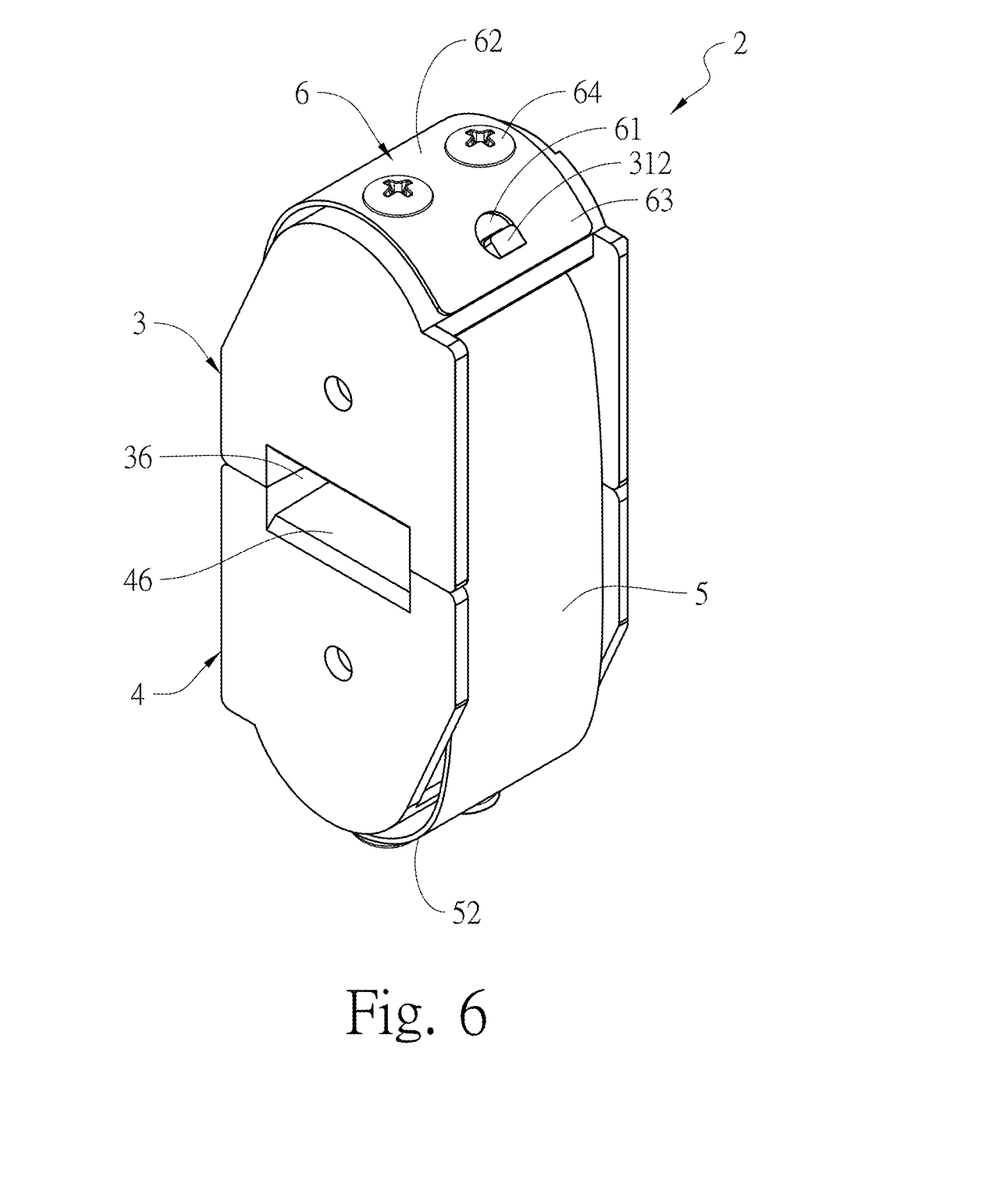
FIG. 6 a perspective view showing a preferred embodiment of an elastic telescopic module according to the present invention.
Figure 7:
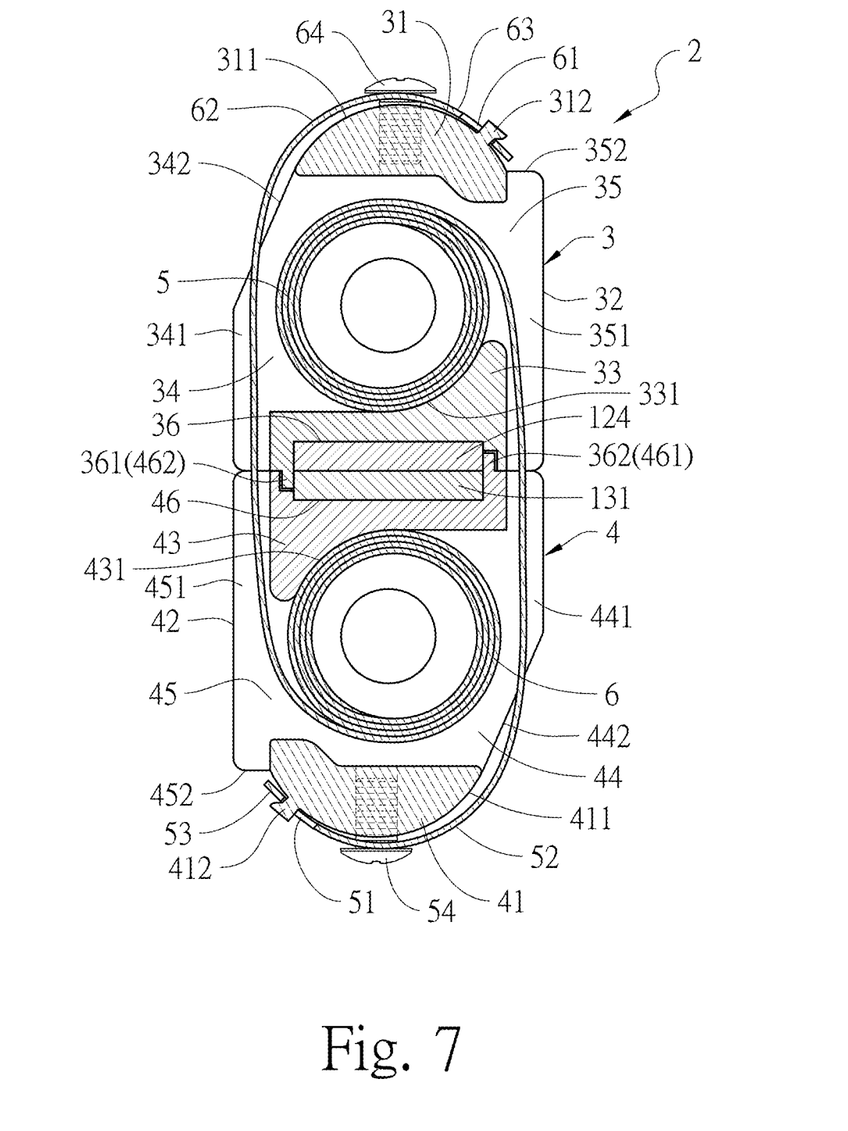
FIG. 7 and FIG. 8 are cross-section views showing the preferred embodiment of the elastic telescopic module during the process of upward or downward movement according to the present invention.
Figure 8:
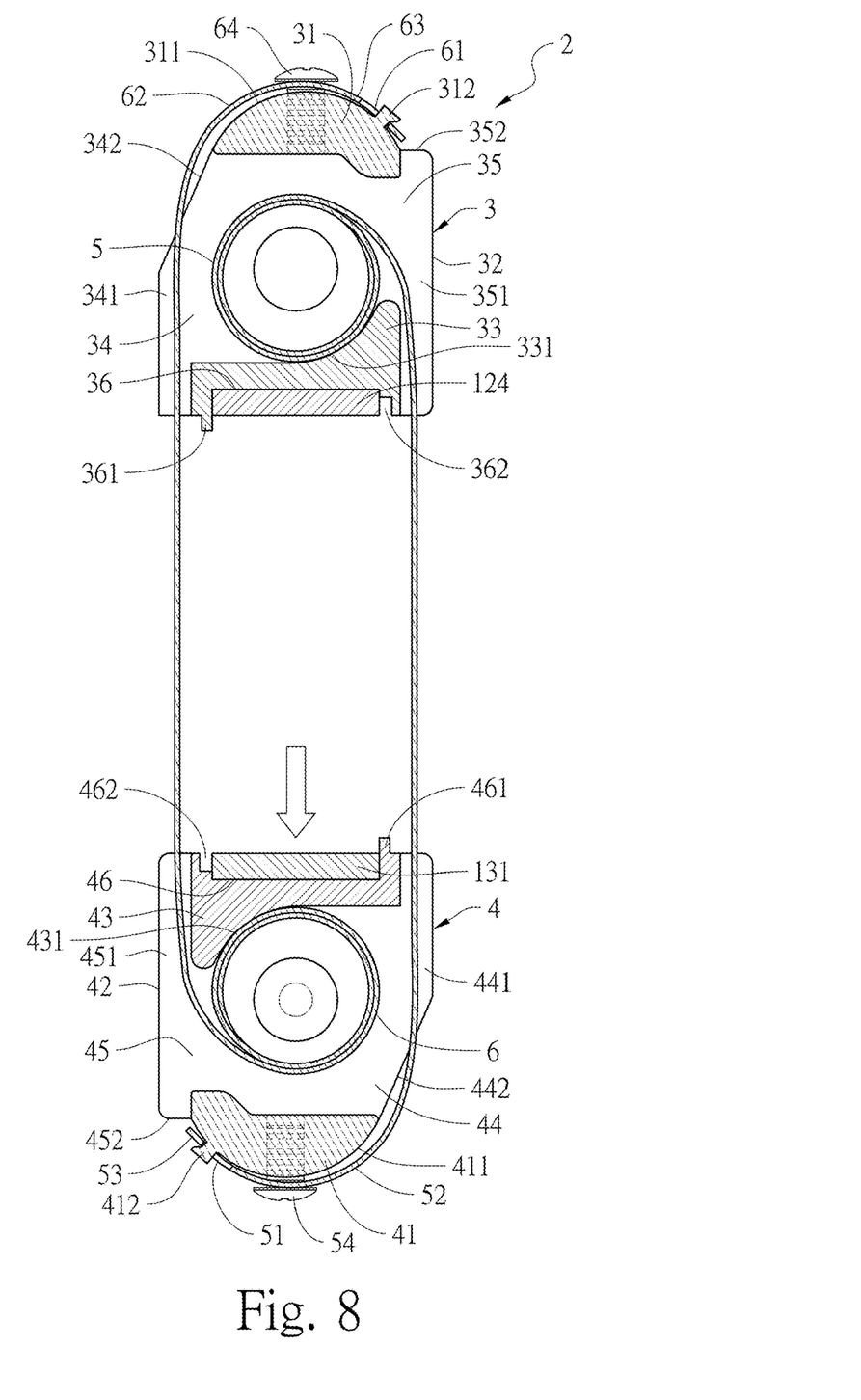

Refer to FIGS. 1 to 8 showing a preferred embodiment of an elevating structure 1 according to the present invention. The elevating structure 1 comprises a base 11, a support 12, an adapter 13, and an elastic telescopic module 2. The base 11 is placed on a table. The support 12 has a bottom surface connected onto the top surface of the base 11, so that the straight-shaped support 12 stands on the base vertically. The support 12 has one lateral surface recessed with an elongate position-limiting slot 121 for one end portion of the elastic telescopic module (that is, a second frame body 4 and a coil spring part of a second constant-force spring 6) and one opposing end portion (a first frame body 3 and a coil spring part of a first constant-force spring 5) corresponding to above end portion to be connected or disconnected with each other. The opposing end portion of the elastic telescopic module 2 is positioned at the internal wall of the rear side of the elongate position-limiting slot 121. A pair of guide tracks (122, 123) is provided respectively at a left side and a right side of the elongate position-limiting slot 121, so as to limit the longitudinal elevation of the end portion of the elastic telescopic module 2 within the elongate position-limiting slot 121. Thereby, the end portion of the elastic telescopic module 2 is able to be stably moved away from or close to the opposing end portion of the elastic telescopic module 2 to be connected therewith. The adapter 13 has a cuboid shape. The adapter 13 is placed between the two guide tracks (122, 123), and is located in the elongate position-limiting slot 121. The adapter 13 has a left side and a right side respectively connected with the guide tracks (122, 123). In an embodiment, the adapter has a lateral surface provided with a plurality of V-shaped bearing lap joints used as the rails of the guide tracks or detachable round bars. Alternatively, for example, the movable short internal rails of a ball bearing slide track can be used to be in connection with the lateral surface of the adapter 13, and the fixed external rails of the ball bearing slide track, even together with its ball retainer, are used as the guide tracks (122, 123). Thereby, the top end of the adapter 13 can be connected to the back panel 14 of a display. Moreover, the adapter 13 has one end connected with the second frame body 4 of the elastic telescopic module 2 and that end of the adapter 13 is further provided with a protruding plate 131 extending horizontally, so as to be inserted into and connected with a second position-limiting slot 46 recessed on the top end of the second frame body 4. The second position-limiting slot 46 is provided with two symmetrically arranged second in-slot bevel surfaces (463, 464) therein. After the protruding plate 131 is horizontally inserted into and positioned in the second position-limiting slot 46, the protruding plate 131 has a bevel surface 132 correspondingly jointed with one second in-slot bevel surface 463. The elongate position-limiting slot 121 of the support 12 has another protruding plate 124. The first frame body 3 of the elastic telescopic module 2 has a bottom end recessed with a first position-limiting slot 36. The first position-limiting slot 36 is provided with two symmetrically arranged first in-slot bevel surfaces (363, 364) therein. After the protruding plate 124 is horizontally inserted into and positioned in the first position-limiting slot 36, the protruding plate 124 has a bevel surface 1241 correspondingly jointed with one first in-slot bevel surface 364. The first frame body 3 and the second frame body 4 are thus jointed with each other. A first constant-force spring 5 and a second constant-force spring 6 are respectively placed into a frame body. The first constant-force spring 5 has a spring leaf at one end and the spring leaf is stretched out in advance to pass through the second frame body 4 and over the coil spring part of the second constant-force spring 6, so as to cover one end of the elastic telescopic module 2 (the bottom end of the second frame body 4). The second constant-force spring 6 has a spring leaf at one end and the spring leaf is stretched out in advance to pass through the first frame body 3 and over the coil spring part of the first constant-force spring 5, so as to cover an opposing end of the elastic telescopic module 2 (the top end of the first frame body 3). Thereby, a pattern of being partially covered with each other is formed, so that the display, the adapter 13, and the second frame body 4 can be moved upward or downward relative to the support 12 and the first frame body 3.

In addition, in the elongate position-limiting slot 121 of the support 12, a longitudinal tract 125 is provided on the internal wall surface of the elongate position-limiting slot 121. The protruding plate 124 is perpendicular to the longitudinal track 125. The second frame body 4 has one lateral surface provided with a second longitudinal groove 47, and the second longitudinal groove 47 is correspondingly jointed with the longitudinal track 125 to facilitate the positioning during the assembling process. The second frame body 4 stably moves upward or downward in the elongate position-limiting slot 121 along the longitudinal track 125. Moreover, the first frame body 3 has a lateral surface provided with a first longitudinal groove 37. The first longitudinal groove 37 is also correspondingly jointed with the longitudinal track 125 to facilitate the positioning during the assembling process.

Figure 9:
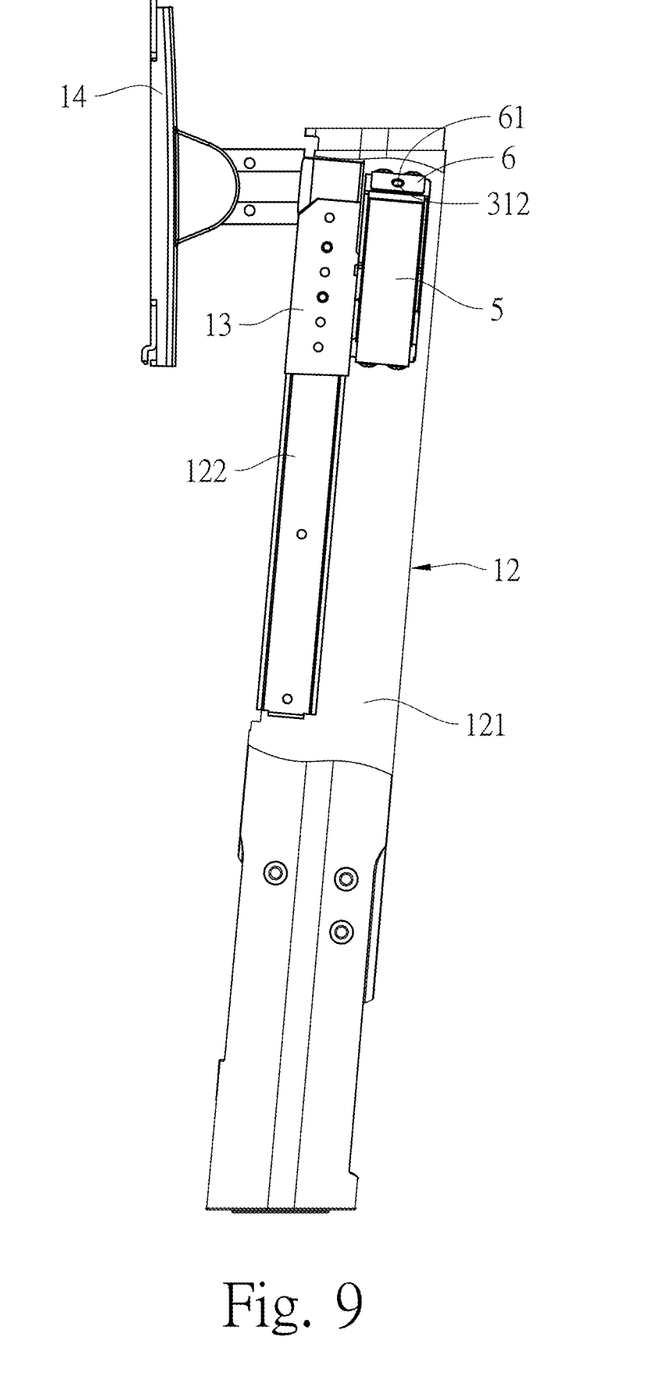
FIG. 9 and FIG. 10 are schematic views showing the use of the elastic telescopic module during the process of upward or downward movement according to the present invention.
Figure 10:
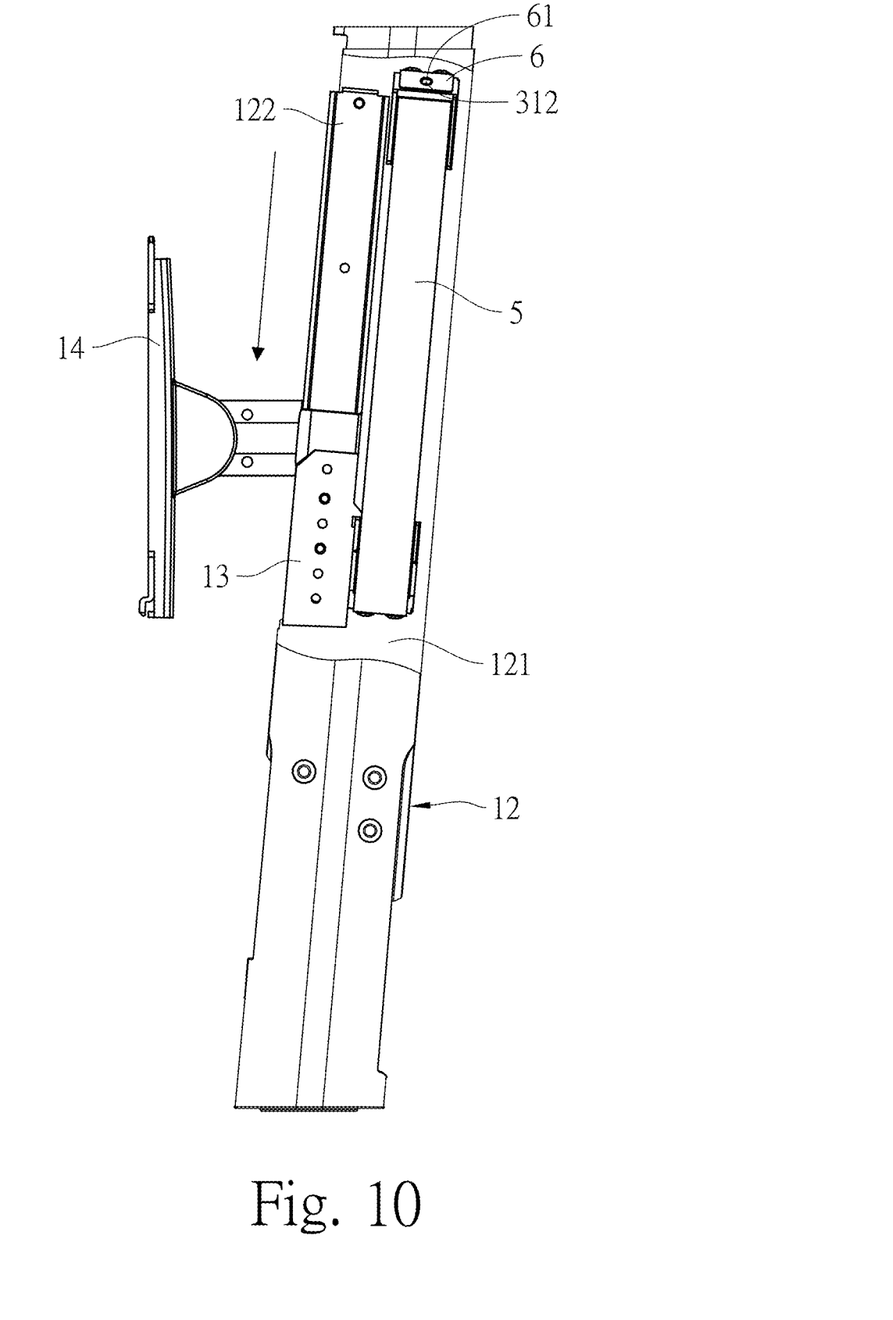

Refer to FIGS. 4 to 10 showing a preferred embodiment of the elastic telescopic module 2 according to the present invention. The elastic telescopic module 2 comprises a first frame body 3, a second frame body 4, a first constant-force spring 5, and a second constant-force spring 6. The structures of these components and their relationships are detailed in the following.

The first frame body 3 includes a top end and a bottom end reverse to the top end. The first frame body 3 includes a top plate 31, two parallel first lateral plates 32, and a first stop plate 33. The top plate 31 has a top end provided with an upper convex surface 311 and the upper convex surface 311 has a surface provided with a protruding block, and the protruding block is used as an upper positioning part 312. The upper positioning part 312 has a top end provided with a hook structure. The top plate 31 and the two first lateral plates 32 are arranged to form a first accommodating space 34. The first stop plate 33 has a front end and a rear end respectively connected with the two first lateral plates 32, so that the left and the right plate edges of each first lateral plate 32 are arranged to be corresponding to the left and right internal wall surfaces of the elongate position-limiting slot 121. The first stop plate 33 is provided with a protruding top edge and a first concave surface 331. The first concave surface 331 is descended steeply from a top edge and then becomes leveled, and is located in the first accommodating space 34 for correspondingly receiving the first constant-force spring 5. The top edge of the first stop plate 33, a lower portion of the top plate 31, and the two first lateral plates 32 are together arranged to form a first window 35 for the spring leaf at one end of the first constant-force spring 5 to pass out. The first stop plate 33 of the first frame body 3 has a bottom end recessed with a first position-limiting slot 36. The first position-limiting slot 36 has two lateral sides respectively provided with at least one first tenon 361 and at least one first hole 362. The top end of the first frame body 3 has two lateral sides respectively formed with a step portion (342, 352), and each step portion (342, 352) has an opening. Two parallel first channels (341, 351) are provided between the two first lateral plates 32. One first channel 341 is located adjacent to the first accommodating space 34 to longitudinally communicate the first accommodating space 34 with the opening of the (oblique) step portion 342 provided on one lateral side of the top end of the first frame body 3, for the spring leaf of the second constant-force spring 6 to pass through and to attach its one end onto the upper convex surface 311, Another channel 351 is located adjacent to the first window 35 to longitudinally communicate the first window 35 with the opening of the (leveled) step portion 352 provided on the other lateral side of the top end of the first frame body 3 for the spring leaf of the first constant-force spring 5 to pass through.

The second frame body 4 includes a top end and a bottom end reverse to the top end. The top end of the second frame body 4 is located beneath the bottom end of the first frame body 3. The second frame body 4 includes a bottom plate 41, two parallel second lateral plates 42, and a second stop plate 43. The bottom plate 41 has a bottom end provided with an lower convex surface 411 and the lower convex surface 411 has a surface provided with a protruding block, and the protruding block is used as an lower positioning part 412. The lower positioning part 412 has a bottom end provided with a hook structure. The bottom plate 41 and the two second lateral plates 42 are arranged to form a second accommodating space 44. The second stop plate 43 has a front end and a rear end respectively connected with the two second lateral plates 42, so that the left and the right plate edges of each second lateral plate 42 are arranged to be corresponding to the left and right internal wall surfaces of the elongate position-limiting slot 121. The second stop plate 43 is provided with a protruding top edge and a second concave surface 431. The second concave surface 431 is ascended steeply from a bottom edge, and then becomes leveled and is located in the second accommodating space 34 for correspondingly receiving the second constant-force spring 6. The bottom edge of the second stop plate 43, an upper portion of the bottom plate 41, and the two second lateral plates 42 are together arranged to form a second window 45 for the spring leaf at one end of the second constant-force spring 6 to pass out. The second stop plate 43 of the second frame body 4 has a top end recessed with a second position-limiting slot 46. The second position-limiting slot 46 has two lateral sides respectively provided with at least one second tenon 461 and at least one second hole 462. The at least one second tenon 461 is correspondingly jointed with the at least one first hole 462, and the at least one first tenon 461 is correspondingly jointed with the at least one second hole 462, so as to have the first position-limiting slot 36 and the second position-limiting slot 46 jointed with each other to form an inserting slot. The protruding plate 131 and the protruding plate 124 are both inserted into this inserting slot. The bottom end of the second frame body 4 has two lateral sides respectively formed with a step portion (442, 452), and each step portion (442, 452) has an opening. Two parallel second channels (441, 451) are provided between the two second lateral plates 42, to protect and for the spring leaves that are stretched out in advance of the two constant-force springs to pass. One second channel 441 is located adjacent to the second accommodating space 44 to longitudinally communicate the second accommodating space 44 with the opening of the (oblique) step portion 442 provided on one lateral side of the bottom end of the second frame body 4, for the spring leaf of the first constant-force spring 5 to pass through and to attach its one end onto the lower convex surface 411. The other channel 451 is located adjacent to the second window 45 to longitudinally communicate the second window 45 with the opening of the (leveled) step portion 452 provided on the other lateral side of the bottom end of the second frame body 4 for the spring leaf of the second constant-force spring 6 to pass through.

The coil spring part of the first constant-force spring 5 is positioned in the first accommodating space 34 of the first frame body 3. It can be pivotally positioned by using a pivot axis. The first constant-force spring 5 has one end provided with a curved section 52 with preset deformation, and the spring leaf at that end is provided with a connection section 53 and the connection section 53 has a first hole 51. The curved section 52 and the connection section 53 of the spring leaf at one end of the first constant-force spring 5 passes out from the first accommodating space 34 via the first window 35 of the first frame body 3, and then passes through another first channel 351 and a second channel 441 connected therewith. After that, it passes out via the opening of one (oblique) step portion 442 provided at the bottom end of the second frame body 4, and passes over the lower convex surface 411 of the second frame body 4, to have the hook structure at the bottom end of the lower positioning part 412 catch on the first hole 51 of the connection section 53. In this way, the connection section 53 is fitted with the lower positioning part 412 at the bottom end of the second frame body 4 to be positioned, so as to prevent the spring leaf at one end of the first constant-force spring 5 from being loosened. Moreover, the curved section 52 is correspondingly attached onto the lower convex surface 411, so as to straighten the stretched spring leaf. More preferably, the curved section 52 of the first constant-force spring 5 is fixed onto, for example, screwed via a first press-fit piece 54 (such as a screw) with, the lower convex surface 411 at the bottom end of the bottom plate 41 of the second frame body 4, so as to prevent the stretched spring leaf of the first constant-force spring 5 from being arched and to stabilize its stretching.

The coil spring part of the second constant-force spring 6 is positioned in the second accommodating space 44 of the second frame body 4. In implementation, it can be pivotally positioned by using a pivot axis. The second constant-force spring 6 has one end the spring leaf of which is provided with a curved section 62 with preset deformation, and the spring leaf at that end is provided with a connection section 63, and the connection section 63 has a second hole 61. The curved section 62 and the connection section 63 of the spring leaf at one end of the second constant-force spring 6 passes out from the second accommodating space 44 via the second window 45 of the second frame body 4, and then passes through another second channel 451 and a first channel 341 connected therewith. After that, it passes out via the opening of one (oblique) step portion 342 provided at the top end of the first frame body 3, and passes over the upper convex surface 311 of the first frame body 3, to have the hook structure at the top end of the upper positioning part 312 catch on the second hole 61 of the connection section 63. In this way, the connection section 63 is fitted with the upper positioning part 312 at the top end of the first frame body 3 to be positioned, so as to prevent the spring leaf at one end of the second constant-force spring 6 from being loosened. Moreover, the curved section 62 is correspondingly attached onto the upper convex surface 311, so as to straighten the stretched spring leaf. More preferably, the curved section 62 of the second constant-force spring 6 is fixed onto, for example, screwed via a second press-fit piece 64 (such as a screw) with, the upper convex surface 311 at the top end of the top plate 31 of the first frame body 3, so as to prevent the stretched spring leaf of the second constant-force spring 6 from being arched and to stabilize its stretching.

Thereby, the left side and the right side of the adapter 13 are respectively connected with a guide track (122, 123). The two guide tracks (122, 123) are respectively received and limited within the elongate position-limiting slot 121 provided at one lateral surface of the support 12. It can be used together with one longitudinal track 125 in the elongate position-limiting slot 121 to facilitate the assembling and the positioning of the whole elastic telescopic module 2. Moreover, since the protruding plate 131 of the adapter 13 and the protruding plate 124 of the support 12 are respectively inserted horizontally into the inserting slot between the first frame body 3 and the second frame body 4, and the protruding plate 131 and the protruding plate 124 are jointed with each other via their respective surface, so as to prevent each frame body from being deformed. It is not only able to provide the holding function from the left and right directions for the adapter 13, but it is also able to provide the holding function from the rear direction. Moreover, it is also capable of guiding and resisting the torsion, so that it is able for a display to stably and smoothly move upward and downward. During the process of the downward movement of the display and the adapter 13 and the protruding plate 131 of the adapter 13 is moved downward to be pressed against the second frame body 4, the protruding plate 124 of the support 12 is pressed against the first frame body 3, so that the second frame body 4 can be moved downward with the adapter 13 relative to the support 12 and the first frame body 3. In this way, the second frame body 4 and the coil spring part at another end of the second constant-force spring 6 therein are moved away from the first frame body 3 and the coil spring part at another end of the constant-force spring 5 therein, so as to have the spring leaf of the first constant-force spring 5 and the spring leaf of the second constant-force spring 6 synchronously gradually straightened to be parallel to the two lateral wall surfaces of the support 12. On the contrary, during the process of the upward movement of the second frame body 4, the second frame body 4 is drawn back by the elastic force provided by the two constant-force springs, and the adapter 13 has its protruding plate 131 to be pressed against the second frame body 4 to be moved synchronously upward. Moreover, the use of the second longitudinal groove 47 together with the longitudinal track 125 is able to stabilize the guiding and to prevent the collision caused by the rebounding until it returns back to its original position to be jointed with the first frame body 3. During the vertical movement of the display and the adapter 13, the display can be halted at a fixed position of a certain height by the elastic force provided by the first constant-force spring 5 and the second constant-force spring 6 and the support provided by the constant elastic force.

Therefore, the present invention has following advantages:

1. According to the present invention, two constant-force springs, which are partially covered with each other, are used to support uniformly the vertical movement of the display, so as to prolong the service life of a product and reduce the space required for its assembling. Thereby, the overall structure is able to meet the requirement of being thinner and miniaturized, to increase the range of the movement, and consequently to increase its range of the applicability to displays with different dimensions and types, and to increase the convenience in use.
2. According to the present invention, the constant-force springs are assembled in the pattern of being partially covered with each other. The spring leaf at one end of each of at least two constant-force springs are stretched out in advance and are guided and protected respectively by the windows, the channels, the openings of the step portions of the two frame bodies, so as to have the curved section of each constant-force spring attached onto the upper convex surface of the first frame body or the lower convex surface of the second frame body to be positioned by means of the convex surface and the protruding block having hook structure. Moreover, the constant-force spring can be stretched out without being arched by changing the fixing position of the screw or other press-fit pieces. Accordingly, during the stretching process of the two constant-force springs, it is able to prevent effectively the spring leaf that is gradually stretched out from being bent and curved and thus rubbed against the lateral surface of the support, so that each spring leaf can be protected by respective frame body. Therefore, it is able to make the overall movement smoother, to prolong the service life of the product, to reduce the space required for the assembling of each constant-force spring, to increase the range of the movement, and to provide better inflexibility in use.
3. According to the present invention, the first frame body and the second frame body of the elastic telescopic module use the same module. These two frame bodies are butt-jointed together vertically, and then the first constant-force spring and the second constant-force spring are respectively installed into the first frame body and the second frame body. After the spring leaves are stretched out in advance and are partially covered with each other, the two constant-force springs are installed into the elongate position-limiting slot at one lateral surface of the support in a modularized way. In this way, it is not only able to make it more convenient for the assembling process, but it is also able to simplify the procedure and save the maintenance cost and the assembling cost.

Although the embodiments of the present invention have been described in detail, many modifications and variations may be made by those skilled in the art from the teachings disclosed hereinabove. Therefore, it should be understood that any modification and variation equivalent to the spirit of the present invention be regarded to fall into the scope defined by the appended claims.

What is claimed is:

1. An elastic telescopic module, comprising:
   a first frame body, including a top end and a bottom end reverse to the top end, and provided with a first accommodating space therein;
   a second frame body, including a top end and a bottom end reverse to the top end, where the top end of the second frame body is located beneath the bottom end of the first frame body, and the second frame body is provided with a second accommodating space therein;
   a first constant-force spring, located within the first accommodating space of the first frame body, where the first constant-force spring has one end passing out of the first accommodating space and fixed onto the bottom end of the second frame body; and
   a second constant-force spring, located within the second accommodating space of the second frame body, where the second constant-force spring has one end passing out of the second accommodating space and fixed onto the top end of the first frame body;
   wherein the top end of the first frame body is provided with an upper positioning part for positioning one connection section of one end of the second constant-force spring, and the upper positioning part is a protruding block, the connection section has a second hole into which the upper positioning part is fitted, and the upper positioning part has a top end provided with a hook structure for preventing one end of the second constant-force spring from being loosened.

2. The elastic telescopic module according to claim 1, wherein the top end of the first frame body is provided with an upper convex surface, the second constant-force spring has one end provided with a curved section with a preset deformation, and the curved section is used to be connected with and fastened onto the upper convex surface.

3. The elastic telescopic module according to claim 2, wherein the curved section of the second constant-force spring is further locked onto the upper convex surface of the first frame body by a first piece.

4. The elastic telescopic module according to claim 1, wherein the first frame body includes a top plate, two first lateral plates, and a first stop plate; the top plate and the two first lateral plates are arranged to form the first accommodating space; the first stop plate has two ends respectively connected with the two first lateral plates; the first stop plate is provided with a protruding top edge and a first concave surface; the first concave surface is used for correspondingly receiving the first constant-force spring; and the top edge of the first stop plate, the top plate, and the two first lateral plates are arranged to form a first window from which one end of the first constant-force spring passes out.

5. The elastic telescopic module according to claim 4, wherein the top end of the first frame body has two lateral sides respectively formed with a step portion having an opening; two parallel first channels are provided between the two first lateral plates; one first channel is located adjacent to the first accommodating space to communicate the first accommodating space with the opening of the step portion provided on one lateral side of the top end of the first frame body for the second constant-force spring's spring leaf to pass through; the other first channel is located adjacent to the first window to communicate the first window with the opening of the step portion provided on the other lateral side of the top end of the first frame body for the first constant-force spring's spring leaf to pass through.

6. The elastic telescopic module according to claim 1, wherein the bottom end of the second frame body is provided with a lower convex surface; and the first constant-force spring has one end provided with a curved section with a preset deformation, and the curved section is used to be connected with and fastened onto the lower convex surface.

7. The elastic telescopic module according to claim 6, wherein the curved section of the first constant-force spring is further locked onto the lower convex surface of the second frame body by a second piece.

8. The elastic telescopic module according to claim 1, wherein the bottom end of the second frame body is provided with a lower positioning part for positioning one connection section of one end of the first constant-force spring.

9. The elastic telescopic module according to claim 8, wherein the lower positioning part is a protruding block, the connection section has a first hole into which the lower positioning part is fitted, and the lower positioning part has a bottom end provided with a hook structure for preventing one end of the first constant-force spring from being loosened.

10. The elastic telescopic module according to claim 1, wherein the second frame body includes a bottom plate, two second lateral plates, and a second stop plate; the bottom plate and the two second lateral plates are arranged to form the second accommodating space; the second stop plate has two ends respectively connected with the two second lateral plates; the second stop plate is provided with a protruding bottom edge and a second concave surface; the second concave surface is used for correspondingly receiving the second constant-force spring; and the bottom edge of the second stop plate, the bottom plate, and the two second lateral plates are arranged to form a second window from which one end of the second constant-force spring passes out.

11. The elastic telescopic module according to claim 10, wherein the bottom end of the second frame body has two lateral sides respectively formed with a step portion having an opening; two parallel second channels are provided between the two second lateral plates; one second channel is located adjacent to the second accommodating space to communicate the second accommodating space with the opening of the step portion provided on one lateral side of the bottom end of the second frame body for the first constant-force spring's spring leaf to pass through; the other second channel is located adjacent to the second window to communicate the second window with the opening of the step portion provided on the other lateral side of the bottom end of the second frame body for the second constant-force spring's spring leaf to pass through.

12. An elevating device using the elastic telescopic module according to claim 1, further comprising:
   a base;
   a support, standing on and connected to a top surface of the base, where the support has one lateral surface recessed with an elongate position-limiting slot; the first frame body of the elastic telescopic module is positioned in the elongate position-limiting slot, and a pair of guide tracks is provided at a left side and a right side of the elongate position-limiting slot, so as to limit the longitudinal elevation of the second frame body of the elastic telescopic module within the elongate position-limiting slot; and
   an adapter, having a right side and a left side connected with the pair of guide tracks, where the adapter has one end connected with the second frame body of the elastic telescopic module for moving the second frame body up and down relative to the support and the first frame body.

13. The elevating device according to claim 12, wherein the end of the adapter is further provided with a protruding plate; the top end of the second frame body is provided with a second position-limiting slot for inserting horizontally and positioning the protruding plate therein; the elongate position-limiting slot of the support is provided with another protruding plate; the bottom end of the first frame body is recessed with a first position-limiting slot for inserting horizontally and positioning the other protruding plate therein; thereby, during the process of the protruding plate of the adapter being pressed downward to be against the second frame body, the other protruding plate of the support supports the first frame body to move the second frame body away from the first frame body; during the process of the second frame body being moved upward by the adapter, the second frame body is gradually restored toward and jointed with the first frame body.

14. The elevating device according to claim 13, wherein the first position-limiting slot has two lateral sides respectively provided with at least one first tenon and at least one first hole, the second position-limiting slot has two lateral sides respectively provided with at least one second tenon and at least one second hole; the at least one second tenon is correspondingly connected into the at least one first hole, and the at least one first tenon is correspondingly connected into the at least one second hole, so as to have the first position-limiting slot and the second position-limiting slot jointed with each other to form an inserting slot.

15. The elevating device according to claim 13, wherein the protruding plate of the adapter has a bevel surface; the second position-limiting slot is provided with two second in-slot bevel surfaces therein; and the bevel surface of the protruding plate is jointed with one second in-slot bevel surface.

16. The elevating device according to claim 13, wherein the other protruding plate of the support has a bevel surface; the first position-limiting slot is provided with two first in-slot bevel surfaces therein; and the bevel surface of the protruding plate is jointed with one first in-slot bevel surface.

17. The elevating device according to claim 12, wherein the first frame body has one lateral surface provided with a first longitudinal groove; the elongate position-limiting slot has an internal wall surface provided with a longitudinal track; and the longitudinal track is jointed with the first longitudinal groove.

18. The elevating device according to claim 12, wherein the second frame body has one lateral surface provided with a second longitudinal groove; the elongate position-limiting slot has an internal wall surface provided with a longitudinal track; and the longitudinal track is jointed with the second longitudinal groove.

* * * * *